No. 743,337. Patented November 3, 1903.

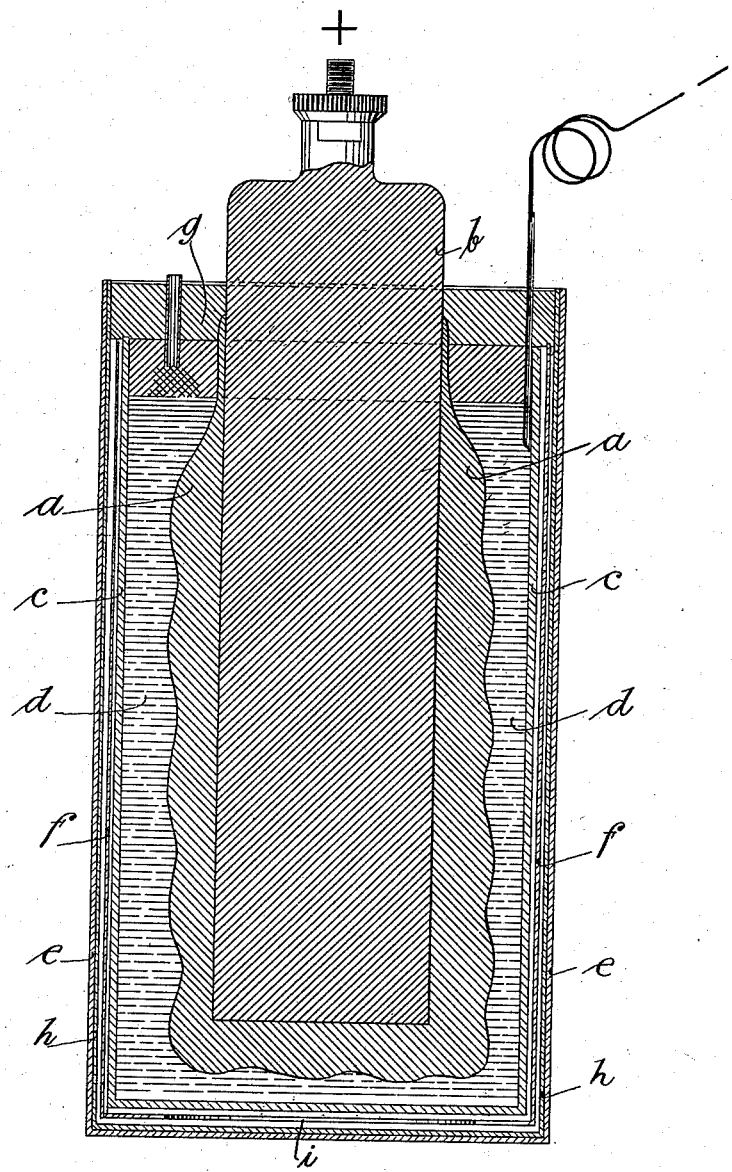

UNITED STATES PATENT OFFICE.

GEORGES SCHAULI AND DOLF LOEWENSTEIN, OF LONDON, ENGLAND.

BATTERY.

SPECIFICATION forming part of Letters Patent No. 743,337, dated November 3, 1903.

Application filed July 14, 1903. Serial No. 165,509. (No model.)

*To all whom it may concern:*

Be it known that we, GEORGES SCHAULI, a subject of the Emperor of Germany, and DOLF LOEWENSTEIN, a subject of the King of Great Britain and Ireland, both residing at London, England, have invented a new and useful Battery, of which the following is a specification.

Our invention relates to improvements in so-called "dry" galvanic or electric batteries whereby the life of the latter is considerably lengthened, while by reducing their internal resistances the batteries are rendered more efficient in every respect; and the objects of the improvements are, first, to provide a zinc vessel suitably amalgamated with mercury, forming the negative-pole electrode, within a containing vessel of tin-plate which is internally lined with zinc; second, to provide an insulating body within the annular space between the containing vessel and the zinc vessel; third, to provide an annular insulating-cover on the zinc vessel to insulate the latter from the containing vessel; fourth, to provide a depolarizing agent around a carbon body serving as the positive-pole electrode, and, fifth, to provide a new filling mass within the space between the zinc vessel and the depolarizing agent, which new filling mass is made of rice and is remarkable for its durability and capacity of resistance against climatic influences, at the same time allowing of the employment of electrolyte in a most concentrated state. The cells of the new battery are so arranged that on the zinc electrode proper being eaten through after a long use the internal zinc lining of the tin-plate containing vessel will assist the zinc vessel in its action, the exciting mass falling out and getting at the zinc lining, so that such a cell will last much longer and remain efficient for a longer time than hitherto. We attain these objects by the arrangement illustrated in the accompanying drawing, which represents a vertical central section of a cell.

*e* denotes a containing vessel, of tin-plate, which is internally lined with a zinc layer *h* by galvanization.

*c* is a zinc vessel which forms the negative-pole electrode and is insulated from the containing vessel *e* by means of a body *f* of insulating material—such as, for instance, paraffined paper or canvas, linen, &c. Preferably the body *f* is a cylinder which loosely incloses the zinc vessel *e* and is bent over the bottom edge of the latter, so that a large central opening *i* is left. There is but a small space of a few millimeters to be left throughout between the containing vessel *e* and the zinc vessel *c*.

The known positive-pole electrode is a body *b*, of carbon, which is surrounded with a convenient depolarizing agent *a* of any known description.

First the zinc vessel *c* is partly filled with a pulpy exciting mass *d*, according to our invention, and then the positive-pole electrode *b*, with the depolarizing agent *a*, is introduced into the pulpy exciting mass *d*, so that the latter fills the space between the zinc vessel *c* and the depolarizing agent *a* up to a certain distance beneath the upper edge of the zinc vessel *c*. Preferably the containing vessel *e* is made about ten millimeters higher than the zinc vessel *c*. Both vessels are closed at the top by a cover *g*, made of insulating material—such as, for instance, a mixture of sulfur and resin—whereby the exciting mass *d* is prevented from entering the space between the zinc vessel *c* and the containing vessel *e* as long as the zinc vessel *c* has not been eaten through. When, however, after a long use the zinc vessel *c* has been eaten through, the exciting mass will fall through the openings so produced and form a conductor between the internal zinc lining *h* of the containing vessel *e* and the dissolving remaining parts of the zinc vessel *c* through the bottom opening *i* of the insulating body *f*. To insure in all cases this formation of a metallic bridge between the zinc lining *h* and the zinc vessel *c*, the cylindrical wall of the latter is preferably made a little thicker than the bottom, so that after uniform waste it is the bottom which will first become defective. Moreover, several radial strips at the bottom of the zinc vessel *c* may be covered with a protecting layer, or several metallic ribs or strengthen-strips may be provided on the bottom, so that these strips or ribs will fall down on the bottom part of the zinc lining *h* after the zinc bottom has been eaten through, and thus retain their connection with the cylindrical part, or, if desired, a separate terminal may be provided on the case *e* for the purpose of making metallic connection between the zinc vessel c and the outer case e.

The new filling mass for the reception of the concentrated electrolyte is prepared from rice as follows: The raw rice is first steeped in cold water for one or several days until a sufficient quantity of malt is formed, the whole boiled, with a little water added, down to the consistence of syrup, when owing to the presence of the malt the greater part of the starch will be changed into grape-sugar. To the hot mass salts and the like serving as electrolytes are then added. Owing to its peculiar chemical composition the exciting mass so prepared is considerably less liable to deterioration by fermentation or desiccation than any of the organic substances hitherto employed for the same purpose. Electric batteries containing this new exciting mass will therefore resist all climatic influences either in tropical, damp, or cold countries. As in opposition to inorganic substances already employed as filling masses for electric batteries—such as, for instance, silicic acid, &c.—the new filling mass of prepared rice affords the essential advantage of a greater capacity of absorbing the salts of the electrolyte and of an absolute chemical indifference for the same. The new filling mass made of rice is especially suitable for absorbing the salmiac and quicksilver combinations forming the bases of most exciting masses, since its syrup-like consistence, on the one part, facilitates the chemical action of these combinations and, on the other part, prevents the crystallization of the salts on the electrodes.

The so-called "dry" electric batteries provided with the new filling mass in combination with the suitable exciting substances are remarkable and advantageous for their low internal resistance and high pressure and also high intensity.

What we claim as our invention, and desire to secure by Letters Patent, is—

1. In an electric battery, the combination with a containing vessel lined internally with zinc, of a zinc vessel adapted to form the negative-pole electrode, an insulating vessel having a central bottom opening and located between said containing vessel and said zinc vessel, a positive-pole electrode within said zinc vessel, a depolarizing agent forming a lining for said positive-pole electrode, an exciting mass of non-absorbing character filling the space between the said zinc vessel and said depolarizing agent, and a cover separating said exciting mass from the space between said containing vessel and said zinc vessel, said exciting mass being a substance formed by steeping raw rice until formation of malt and boiling it with a little water down to the consistence of syrup, after which the electrolyte is added.

2. In an electric battery, the combination with a containing vessel of tin-plate and lined internally with zinc, of a zinc vessel adapted to form the negative-pole electrode, an insulating vessel having a central bottom opening and fitted loosely between said containing vessel and said zinc vessel, a carbon body within said zinc vessel and adapted to form a positive-pole electrode, a depolarizing agent forming a lining for said carbon body, an exciting mass filling the space between said zinc vessel and said depolarizing agent, and a cover of insulating material for separating said exciting mass from the space between said containing vessel and said zinc vessel, said exciting mass being a filling mass formed by steeping raw rice in water until the partial formation of malt and boiling it with a little water down to the consistence of syrup, after which the salts of the electrolytes are added to the hot mass.

3. In an electric battery, the combination with a cylindrical containing vessel of tin-plate and lined internally with zinc, of a cylindrical zinc vessel adapted to form the negative-pole electrode, the thickness of said zinc vessel being a little greater in its cylindrical part than in its bottom, a cylindrical insulating vessel having a central bottom opening and fitted loosely between said containing vessel and said zinc vessel while leaving a narrow space between their bottoms, a carbon body within said zinc vessel and adapted to form the positive-pole electrode, a depolarizing agent forming a lining for said carbon body, an exciting mass filling the space between said zinc vessel and said depolarizing agent, and a cover of insulating material for separating said exciting mass from the space between said containing vessel and said zinc vessel, said exciting mass being a substance formed by steeping raw rice in water until the partial formation of malt and boiling it with a little water down to the consistence of syrup, after which the exciting salts are added to the hot mass.

In witness whereof we have hereunto set our hands in presence of two witnesses.

GEORGES SCHAULI.
DOLF LOEWENSTEIN.

Witnesses:
H. D. JAMESON,
A. NUTTING.